UNITED STATES PATENT OFFICE.

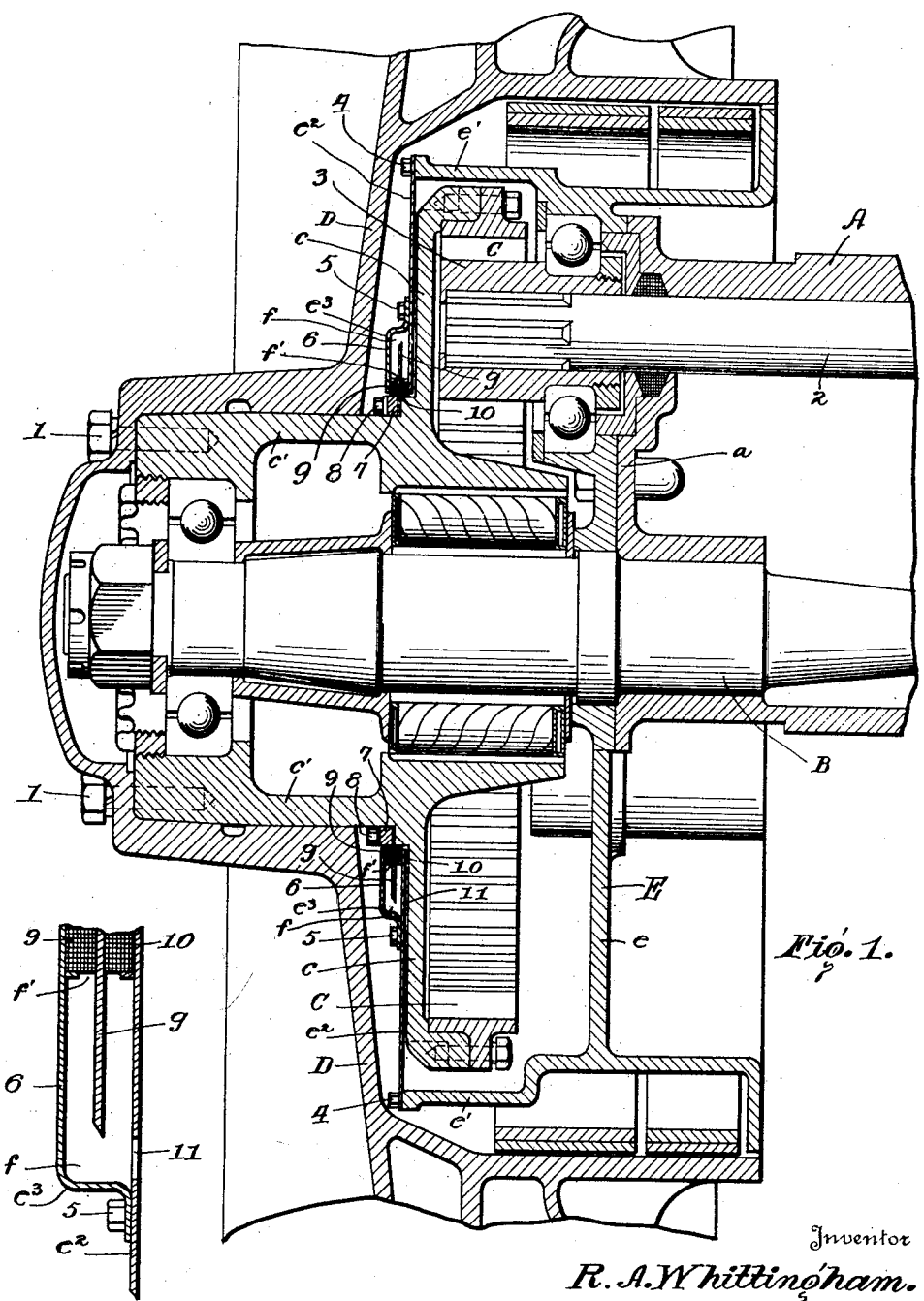

RICHARD A. WHITTINGHAM, OF NEWARK, DELAWARE.

HOUSING FOR TRUCK DRIVING-GEARS.

1,400,119.   Specification of Letters Patent.   Patented Dec. 13, 1921.

Application filed May 5, 1920. Serial No. 379,044.

*To all whom it may concern:*

Be it known that I, RICHARD A. WHITTINGHAM, a citizen of the United States, residing at Newark, in the county of New Castle and State of Delaware, have invented certain new and useful Improvements in Housings for Truck Driving-Gears, of which the following is a specification.

This invention relates to improvements in housings for the driving gears of trucks and tractors, the object of the invention being to provide a housing which will hold lubricant for the gears and effectively prevent the lubricant from leaking out of the housing on to the braking mechanism.

In the accompanying drawing, which illustrates the invention,

Figure 1 is a central, vertical section through one end of a truck axle, the driving gears and housing and a portion of one of the traction wheels; and, Fig. 2 is a detail view, on a larger scale, of the lower portion of the oil pocket in the housing.

Referring to the drawing, A indicates the dead axle from which projects a spindle B, upon which is mounted an internally toothed driving gear C, having a web $c$ and a hub $c'$. The traction wheel D is removably secured to the hub $c'$ by suitable means, such as the bolts 1. The dead axle is a hollow structure having a closed end $a$, and to said end is secured the rear wall $e$ of a gear housing E. A drive shaft 2, extending from the differential mechanism, (not shown) projects through openings in the walls $a$ and $e$, and carries a pinion 3, which engages the teeth of the driving gear C. The housing E has a part $e'$ which projects outwardly from the rear wall and extends peripherally around the driving gear. To this peripheral wall of the housing is secured the front wall $e^2$, the latter being preferably made of stiff sheet metal and secured to the peripheral wall by bolts 4. This front wall of the housing extends inwardly, close to the hub of the gear and between the web of the gear and the web of the traction wheel, as shown. Secured to the front wall $e^2$, adjacent the hub, by suitable securing means such as the bolts 5, is an annular part $e^3$, preferably made of stiff sheet metal and having an off-set portion 6 lying parallel with the wall $e^2$ and extending inwardly to the hub. This off-set portion forms with the opposing part of the wall $e^2$, an annular pocket $f$, having an annular opening or slit $f'$. A thin ring or disk $g$, secured to the hub by means of a clamping ring 7 and bolts 8, making an oil-tight joint with the hub, extends into the annular pocket, as shown. Packing rings 9 and 10, lying between and preferably secured to the housing parts $e^2$ and $e^3$, at the annular opening in the pocket $f$, bear against opposite sides of the disk or blade $g$ and form an oil-tight joint therewith. The lower part of the pocket $f$ is provided with an opening 11, through the wall $e^2$, which opening communicates with the interior of the housing to allow oil, which may enter the pocket, to drip back into the interior of the housing.

In operation, sufficient oil is maintained in the housing to cover the lowermost teeth of the driving gear, and as the gear rotates this lubricant is carried by the teeth up to the driving pinion and also becomes distributed to the various bearings for the drive shaft and gear hub. The only running joint between the housing and the gear is that formed between the front wall of the housing and the gear hub. In order that any oil may pass into the pocket $f$, it must first pass between the packing 10 and the disk $g$. If oil gets on to the disk $g$, it will be thrown off by centrifugal force on to the peripheral wall of the pocket and it will flow downwardly on the walls of the pocket to the opening 11, and will then flow back into the housing. While the driving gear is in motion, centrifugal force will tend to prevent any oil which is thrown out on the peripheral wall of the pocket from traveling inward on the part 6; but if any oil does move inward on said part, or between said part and the disk $g$, it will be prevented from escaping by the packing 9 and will finally find its way to the bottom of the pocket and escape through the opening 11.

What I claim is:

1. The combination with a dead axle having a wheel spindle, a driving gear having a hub structure, mounted on the spindle and a drive shaft having a pinion engaging the gear, of a gear housing secured to the dead axle and inclosing said gearing, the front wall of said housing having an annular pocket adjacent the gear hub, said pocket having an annular opening and having an opening in its lower part communicating with the interior of the housing, packing rings fitting within said annular opening and bearing on said hub structure, and a disk rotatable with the gear and extending between said packing rings into said pocket.

2. The combination with a dead axle having a wheel spindle, a driving gear, having a hub, mounted on the spindle and a drive shaft having a pinion engaging the gear, of a gear housing secured to the dead axle and inclosing said gearing, the front wall of said housing having an annular pocket adjacent the gear hub, said pocket having an annular opening and having an opening in its lower part communicating with the interior of the housing, and packing rings between the walls of said pocket, a disk rotatable with the gear and extending betwen said packing rings into said housing beyond the rings.

In testimony whereof I affix my signature.

RICHARD A. WHITTINGHAM.